United States Patent
Yao (10) Patent No.: US 9,829,760 B2
(45) Date of Patent: Nov. 28, 2017

(54) ARRAY SUBSTRATE, LIQUID CRYSTAL DISPLAY PANEL AND METHOD FOR DRIVING THE SAME

(71) Applicant: Shenzhen China Star Optoelectronics Technology Co., Ltd., Shenzhen, Guangdong (CN)

(72) Inventor: Xiaohui Yao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 18 days.

(21) Appl. No.: 14/417,707

(22) PCT Filed: Jan. 20, 2015

(86) PCT No.: PCT/CN2015/071061
§ 371 (c)(1),
(2) Date: May 6, 2016

(87) PCT Pub. No.: WO2016/078210
PCT Pub. Date: May 26, 2016

(65) Prior Publication Data
US 2016/0246146 A1 Aug. 25, 2016

(30) Foreign Application Priority Data
Nov. 17, 2014 (CN) .......................... 2014 1 0654293

(51) Int. Cl.
*G02F 1/1362* (2006.01)
*G02F 1/1343* (2006.01)
(Continued)

(52) U.S. Cl.
CPC ...... *G02F 1/136286* (2013.01); *G02F 1/1368* (2013.01); *G02F 1/134309* (2013.01);
(Continued)

(58) Field of Classification Search
None
See application file for complete search history.

(56) References Cited

U.S. PATENT DOCUMENTS

2013/0229326 A1 9/2013 Kamada
2015/0154723 A1* 6/2015 Wu ........................... G06T 1/00
345/522

FOREIGN PATENT DOCUMENTS

CN 203350570 U 12/2013
CN 103676253 A 3/2014
(Continued)

OTHER PUBLICATIONS

International Search Report and Written Opinion, dated Jan. 20, 2015, China.

*Primary Examiner* — Kenneth B Lee, Jr.

(57) ABSTRACT

Related to is an array substrate, a liquid crystal display panel and a method for driving the liquid crystal display panel. In the array substrate, each pixel unit thereon comprises a main-area electrode, a sub-area electrode and a sharing capacitor. a control terminal of a sharing control switch connecting the sharing capacitor to the sub-area electrode is connected, via a first control switch, to a scan line correlated with an $N^{th}$ pixel unit which is arranged in a scanning direction and counted from a present pixel unit, and via a second control switch to a scan line correlated with the present pixel unit. Under a two-dimensional scanning mode, the first control switch is configured to be turned on when at least there is a scan signal on a scan line to which the first control switch is connected, and the second control switch is configured to be turned off when at least there is a scan signal on both a scan line to which the second control switch is connected and on a scan line to which a first control switch of the same stage as the second control switch is connected. Under a three-dimensional scanning mode, the first control (Continued)

switch is configured to be turned off when at least there is a scan signal on the scan line to which the first control switch is connected, and the second control switch is configured to be turned on when at least there is a scan signal on the scan line to which the second control switch is connected.

18 Claims, 5 Drawing Sheets (51) Int. Cl.
　　　*G02F 1/1368*　　　(2006.01)
　　　*G09G 3/00*　　　　(2006.01)
　　　*G09G 3/36*　　　　(2006.01)

(52) U.S. Cl.
　　　CPC ....... *G02F 1/136213* (2013.01); *G09G 3/003* (2013.01); *G09G 3/3614* (2013.01); *G09G 3/3677* (2013.01); *G09G 3/3688* (2013.01); *G02F 2001/134345* (2013.01); *G09G 2300/0426* (2013.01); *G09G 2300/0876* (2013.01); *G09G 2310/0218* (2013.01); *G09G 2310/08* (2013.01); *G09G 2320/0233* (2013.01)

(56) References Cited

FOREIGN PATENT DOCUMENTS

CN　　　103728751 A　　4/2014
CN　　　103941442 A　　7/2014

\* cited by examiner

| Time Axis | → Time | | | | | | | | | |
|---|---|---|---|---|---|---|---|---|---|---|
| | 1st frame | 2nd frame | 3rd frame | 4th frame | 5th frame | 6th frame | 7th frame | 8th frame | 9th frame | ... |
| Input Signal | ☐ | ■ | ☐ | ■ | ☐ | ■ | ☐ | ■ | ☐ | ... |
| | L255 | L0 | L255 | L0 | L255 | L0 | L255 | L0 | L255 | ... |
| L/R | L | R | L | R | L | R | L | R | L | ... |
| Polarity | + | - | + | - | + | - | + | - | + | ... |
| Voltage | 7V | 1V | 7V | 1V | 7V | 1V | 7V | 1V | 7V | ... |
| Voltage Difference | 1V | 5V | 1V | 5V | 1V | 5V | 1V | 5V | 1V | ... |

Table I

Fig. 4A

| Time Axis | → Time | | | | | | | | | |
|---|---|---|---|---|---|---|---|---|---|---|
| | 1st frame | 2nd frame | 3rd frame | 4th frame | 5th frame | 6th frame | 7th frame | 8th frame | 9th frame | ... |
| Input Signal | ☐ | ■ | ☐ | ■ | ☐ | ■ | ☐ | ■ | ☐ | ... |
| | L255 | L0 | L255 | L0 | L255 | L0 | L255 | L0 | L255 | ... |
| L/R | L | R | L | R | L | R | L | R | L | ... |
| Polarity | + | + | - | - | + | + | - | - | + | ... |
| Voltage | 7V | 1V | 5V | 11V | 7V | 1V | 5V | 11V | 7V | ... |
| Voltage Difference | 1V | -5V | -1V | 5V | 1V | -5V | -1V | 5V | 1V | ... |

Table II

Fig. 4B

| Time Axis | 1st frame | 2nd frame | 3rd frame | 4th frame | 5th frame | 6th frame | 7th frame | 8th frame | 9th frame | ... Time |
|---|---|---|---|---|---|---|---|---|---|---|
| Input Signal | L255 | L255 | L255 | L255 | L255 | L255 | L255 | L255 | L255 | ... |
| L/R | L | R | L | R | L | R | L | R | L | ... |
| Polarity | + | + | - | - | + | + | - | - | + | ... |
| Luminance | Dark | light | Dark | light | Dark | light | Dark | light | Dark | light |

Table III

Fig. 4C

ARRAY SUBSTRATE, LIQUID CRYSTAL DISPLAY PANEL AND METHOD FOR DRIVING THE SAME

CROSS-REFERENCE TO RELATED APPLICATIONS

The present disclosure claims benefit of Chinese patent application CN 2014106554293.5, filed on Nov. 17, 2014, and entitled "ARRAY SUBSTRATE, LIQUID CRYSTAL DISPLAY PANEL AND METHOD FOR DRIVING THE SAME," the entire disclosure of which is hereby incorporated by reference.

FIELD OF THE INVENTION

The present disclosure relates to liquid crystal display technology, and particularly to an array substrate and a liquid crystal display panel that are capable of eliminating the luminance difference between the left and right eyes as well as a method for driving the liquid crystal display.

BACKGROUND OF THE INVENTION

Compared with the conventional two-dimensional plane display technology, the three-dimensional imaging technology provides more vivid three-dimensional images, and therefore has become the mainstream of development in display technology. So far, liquid crystal display devices (LCDs) have become major selections for various industries and even home entertainment displays because of such advantages thereof as light and handy appearances, low power consumption, zero radiation and the like. Accordingly, three-dimensional imaging LCDs which are developed based on the original two-dimensional display technology have become a new hot spot to be developed.

The common three-dimensional imaging technology is currently shutter glasses technology. This technology uses a time-division effect, so that left-eye and right-eye lenses of three-dimensional glasses are alternatively switched on in turn. When the right-eye lens is on, the liquid crystal display device outputs an image to be supplied to the right-eye; and when the left-eye lens is on, the LCD outputs an image to be supplied to the left eye. Then, an image viewer, based on the angle difference between viewing angles of the left and right eyes, may synthesize the left-eye and right-eye images in his/her brain to produce a three-dimensional image with depth of field and hierarchical perception.

In the liquid crystal display device, the liquid crystal molecules are generally driven to rotate by alternating current, and the rotation angle of the liquid crystal molecules is changed to enable image display of different gray scales. The reason for such a driving manner is that in case direct current were used to rotate the liquid crystal molecules, mobile ions inside the liquid crystal molecules would move in the same direction, so that another electric field would be generated and thus interfere the rotating direction of the liquid crystal molecules. That is, residual direct current would appear. Typically, to avoid the quality of image display being affected by such residual direct current, voltages exerted on a pixel electrode of a pixel unit should be changed periodically in the liquid crystal display through switch between the positive polarity and the negative polarity of a data signal of image information. However, for the three-dimensional liquid display crystal panel which co-works with the shutter glasses, if a polarity inversion driving method in terms of single-frame is used to switch between the negative polarity and the positive polarity of the data signal of image information, residual charge would appear, which is similar to the case of using residual direct current, thus causing a three-dimensional image sticking (IS).

Figure 4A:
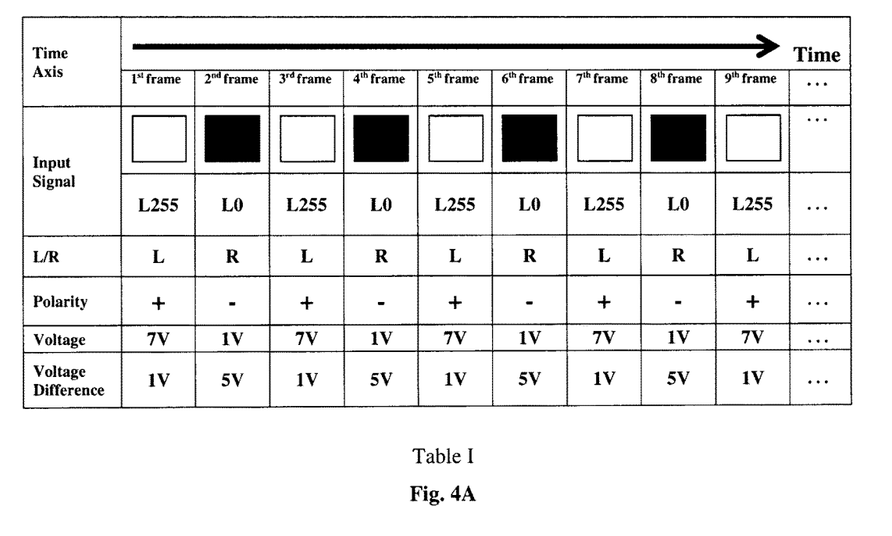
FIG. 4A is Table I.

It is assumed that there is a liquid crystal display device of 256 gray scales, in which a bright screen pervious to light (a white picture with 255 gray scales) is marked as L255, while an opaque, dark screen (a black screen with 0 gray scale) is denoted as L0. Positive and negative driving voltages for the white screen are 7 V and 5 V respectively, and for the black screen, the positive and negative driving voltages are 1 V and 11 V respectively. A common electrode voltage is 6 V. Then, with respect to a certain pixel electrode in the panel, Table I, shown in FIG. 4A, shows changes of a voltage exerted on the pixel electrode and its voltage difference from the common electrode.

It can be seen from Table I that, in this case, the difference of voltage of the pixel electrode relative to the voltage of the common electrode ranges from 1 V to 5 V. That is, a voltage exerting on the liquid crystals is 1 V during a positive polarity driving period, and 5 V during a negative polarity driving period. As the voltages exerted on the liquid crystals during the positive and negative polarity driving periods differ considerably and both present as positive, they cannot cancel each other out, such that the residual charge which is similar to the residual direct current would occur after a long time operation. This leads to a three-dimensional image sticking.

To avoid a three-dimensional image sticking, in the prior art, a polarity inversion driving method in terms of double-frame is used for switching between positive polarity and negative polarity of the data signal of image information. In this driving method, since the polarity of the data signal is switched over every two frames, the voltage of the pixel electrode and its difference from the common electrode respectively vary as shown in Table II, shown in FIG. 4B.

Figure 4B:
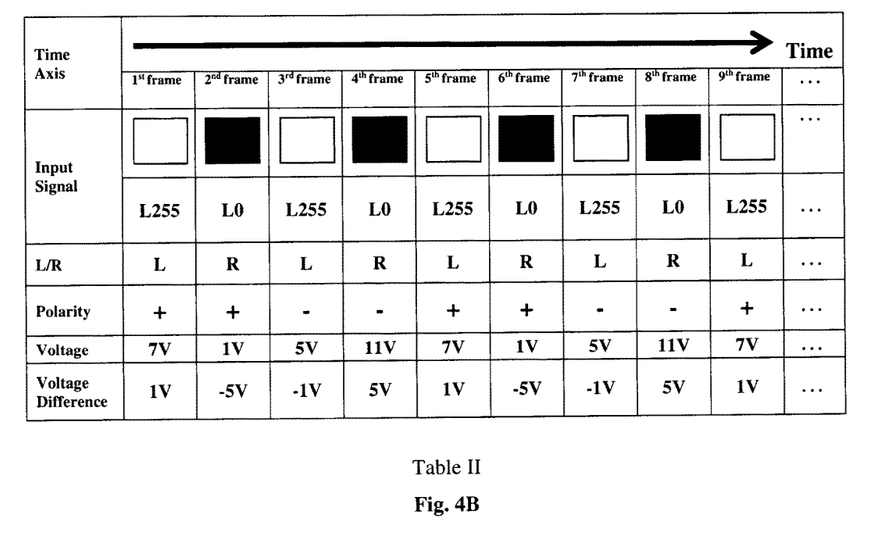
FIG. 4B is Table II.
Figure 4C:
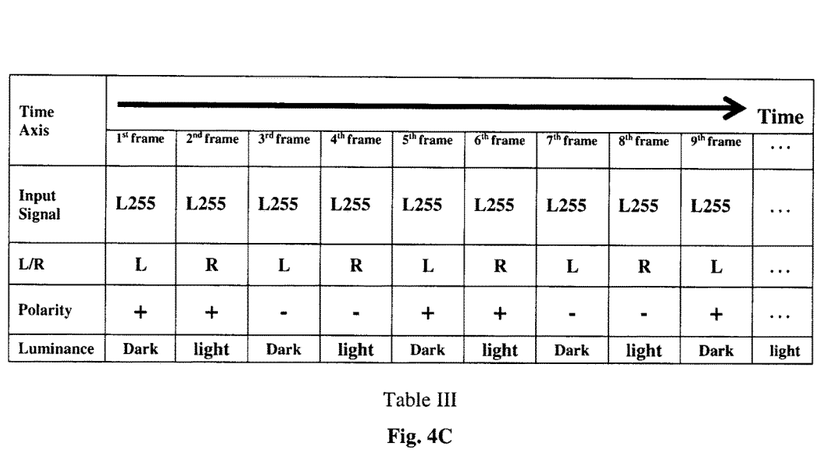
FIG. 4C is Table III.

According to Table II, the voltage difference of the pixel electrode relative to the common electrode, under this situation, repeatedly switches in the cycle of 1 V→−5 V→−1 V→5 V. That is, during the positive polarity driving period, voltages applied to the liquid crystals are 1 V and −5 V; and during the negative polarity voltage driving period, the voltages are −1 V and 5 V. The voltage difference of the pixel electrode relative to the common electrode during the positive polarity driving period may counteract that of the pixel electrode relative to the common electrode during the negative polarity driving period, so that the image sticking can be eliminated. However, this further brings about uneven luminance between the left and right eyes. Such a problem is more conspicuous especially for the liquid crystal display panel which uses charge-sharing technique (LCS) to eliminate the color shift. The reason for the uneven luminance is that, in the liquid crystal display panel, in order to eliminate the color shift due to a large viewing angle, the pixel electrode of each pixel unit is typically divided into two portions, i.e. a main area (Main) and a sub area (Sub), and the pixel unit is provided with a sharing capacitor, such that the charges at the main and sub areas are re-distributed under the control of a control signal, so as to change the voltages of the main and sub areas. Since the charge sharing capacitor has a capability of charge storage, on the one hand, a new frame of image would be brighter due to the charge accumulation effect when the charge obtained by the sharing capacitor during the new frame of image has the same polarity as the charge stored during the previous frame. On the other hand, when the charge obtained by the sharing capacitor during the new frame of image presents opposite polarity against the charge stored in the previous frame, the new frame of image would be darker because of charge counteraction. Therefore, under the same input data signal (e.g., an input signal L255 as shown in Table III, shown in FIG. 4C), the luminance of an image for the left-eye is always weaker than the luminance of an image for the right-eye when output by the liquid crystal display panel is based on the polarity inversion driving method in terms of double-frame.

In response to these problems mentioned above, provided by the present disclosure is, through repeated research and experiments, an array substrate and a liquid crystal display panel that are capable of eliminating the luminance difference between the left and right eyes, and a method for driving the liquid crystal display.

SUMMARY OF THE INVENTION

For these technical problems described above, the objective of the present disclosure is to provide a new array substrate and a liquid crystal display panel, and a method for driving the liquid crystal display panel. The array substrate and the liquid crystal display panel are not only able to overcome, under a two-dimensional scanning mode, the color shift due to a large viewing angle, but also to eliminate the luminance difference between the left and right eyes under a three-dimensional scanning mode.

Provided in the present disclosure is an array substrate, comprising: a plurality of scan lines and a plurality of data lines; and a plurality of pixel units arranged in an array formed by the plurality of scan lines and the plurality of data lines in a staggered manner. Each of the pixel units correlates with one of the scan lines and one of the data lines, and comprises: a main-area electrode connected to a related data line via a main-area control switch, a control terminal of which switch is connected to a related scan line, such that the main-area electrode has, when there is a scan signal on the scan line, a main-area voltage by receiving a data signal from the data line; a sub-area electrode connected to a related data line via a sub-area control switch, a control terminal of which switch is connected to a related scan line, such that the sub-area electrode has, when there is the scan signal on the scan line, a sub-area voltage by receiving the data signal from the data line; and a sharing capacitor connected to the sub-area electrode via a sharing control switch, wherein a control terminal of the sharing control switch is connected, on the one hand, via a first control switch to a scan line correlated with an $N^{th}$ pixel unit which is arranged in a scanning direction and counted from a present pixel unit, and on the other hand, via a second control switch to a scan line correlated with the present pixel unit. Under a two-dimensional scanning mode, the first control switch is configured to be turned on when at least there is a scan signal on a scan line to which the first control switch is connected, and the second control switch is configured to be turned off when at least there is a scan signal on both a scan line to which the second control switch is connected and on a scan line to which a first control switch of the same stage as the second control switch is connected. Under a three-dimensional scanning mode, the first control switch is configured to be turned off when at least there is a scan signal on the scan line to which the first control switch is connected, and the second control switch is configured to be turned on when at least there is a scan signal on the scan line to which the second control switch is connected.

According to an embodiment of the present disclosure, control terminals of the first control switches correlated with pixel units to which odd-numbered scan lines are related are connected in parallel to a first switch-control line to receive a first switch-control signal, and control terminals of the first control switches correlated with pixel units to which even-numbered scan lines are related are connected in parallel to a second switch-control line to receive a second switch-control signal. And, control terminals of the second control switches correlated with pixel units to which the odd-numbered scan lines are related are connected in parallel to a third switch-control line to receive a third switch-control signal, and control terminals of the second control switches correlated with pixel units to which the even-numbered scan lines are related are connected in parallel to a fourth switch-control line to receive a fourth switch-control signal.

The first switch-control signal and the second switch-control signal are timing pulse signals that are synchronized with each other but of opposite polarities, and the third switch-control signal and the fourth switch-control signal are timing pulse signals that are synchronized with each other but of opposite polarities. Meanwhile, the second switch-control signal and the third switch-control signal have the same polarity. A pulse width of each of the timing pulse signals is equal to a time length T of the scan signal.

Under the two-dimensional scanning mode, if N is an odd number, then the first switch-control signal is a pulse train signal in terms of odd sequence, and if N is an even number, the first switch-control signal is a pulse train signal in terms of even sequence. Under the three-dimensional scanning mode, if N is an odd number, then the first switch-control signal is a pulse train signal in terms of even sequence, and if N is an even number, the first switch-control signal is a pulse train signal in terms of odd sequence.

According to an embodiment of the present disclosure, the array substrate is further provided with auxiliary lines each matching one of the scan lines, by means of the auxiliary lines the control terminals of the sharing control switches in the pixel units each being connected to their related first and second control switches.

According to an embodiment of the present disclosure, the first and second control switches may be arranged at a fan-out area.

According to an embodiment of the present disclosure, the main-area control switch, the sub-area control switch, the sharing control switch, and the first control switch and the second control switch each are thin film transistors.

In addition, the present disclosure further provides a liquid crystal display panel, comprising: the array substrate described above, a color filter substrate, and a liquid crystal layer provided between the array substrate and the color filter substrate.

In addition, the present disclosure also provides a method for driving the above liquid crystal display panel, including steps for driving two-dimensional scanning and steps for driving three-dimensional scanning. The steps for driving the two-dimensional scanning comprise: sequentially inputting, in a scanning direction, a scan signal to each scan line; turning off, when a scan signal is input to a scan line, a second control switch connected to the scan line, so as to turn on a main-area control switch and a sub-area control switch in a pixel unit correlated with the scan line, so that a main-area electrode and a sub-area electrode have an identical voltage under the action of a data signal of a corresponding data line; and at the same time, turning on a first control switch connected to the scan line, and turning off a second control switch of the same stage as the first control switch, so that a charge sharing effect is enabled, through an internal sharing capacitor, at the pixel unit related to the first control switch connected to the scan line. The steps for driving the three-dimensional scanning comprises: sequentially inputting, in a scanning direction, a scan signal to each scan line; turning on, when a scan signal is input to a scan line, a second control switch connected to the scan line, so as to turn on a main-area control switch, a sub-area control switch, and a sharing control switch in a pixel unit correlated with the scan line, so that a main-area electrode, a sub-area electrode, and a sharing capacitor have an identical voltage under the action of a data signal of a corresponding data line; and at the same time; and turning off a first control switch connected to the scan line.

According to an embodiment of the present disclosure, a first switch-control signal is applied to control terminals of the first control switches correlated with the pixel units to which the odd-numbered scan lines are related, and a second switch-control signal is applied to control terminals of the first control switches correlated with the pixel units to which the even-numbered scan lines are related. And, a third switch-control signal is applied to control terminals of the second control switches correlated with the pixel units to which the odd-numbered scan lines are related, and a fourth switch-control signal is applied to control terminals of the second control switches correlated with the pixel units to which the even-numbered scan lines are related.

The first switch-control signal and the second switch-control signal are timing pulse signals that are synchronized with each other but of opposite polarities, and the third switch-control signal and the fourth switch-control signal are timing pulse signals that are synchronized with each other but of opposite polarities. Meanwhile, the second switch-control signal and the third switch-control signal have the same polarity. A pulse width of each of the timing pulse signals is equal to a time length T of the scan signal.

Under the two-dimensional scanning mode, if N is an odd number, then the first switch-control signal is a pulse train signal in terms of odd sequence, and if N is an even number, the first switch-control signal is a pulse train signal in terms of even sequence. Under the three-dimensional scanning mode, if N is an odd number, then the first switch-control signal is a pulse train signal in terms of even sequence, and if N is an even number, the first switch-control signal is a pulse train signal in terms of odd sequence.

Other features and advantages of the present disclosure will be set forth in the following explanation, and part of these will be more apparent from the specifications, or may be understood through implementation of the disclosure. The objectives and other advantages of the present disclosure may be achieved and obtained by structures specified in the description, the claims and the accompanying drawings.

DETAILED DESCRIPTION OF THE EMBODIMENTS

To achieve the above objective, the present disclosure provides a new array substrate, and a liquid crystal display panel and a driving method for the liquid crystal display panel. The array substrate comprises: a plurality of scan lines and a plurality of data lines; and a plurality of pixel units arranged in an array formed by the plurality of scan lines and the plurality of data lines in a staggered manner. Each of the pixel units correlates with a scan line and a data line and comprises: a main-area electrode connected to a related data line via a main-area control switch, a control terminal of which switch is connected to a related scan line, such that the main-area electrode may have, when there is a scan signal on the scan line, a main-area voltage by receiving a data signal from the data line; a sub-area electrode connected to a related data line via a sub-area control switch, a control terminal of which switch is connected to a related scan line, such that the sub-area electrode may have, when there is said scan signal on the scan line, a sub-area voltage by receiving the data signal from the data line; and a sharing capacitor connected to the sub-area electrode via a sharing control switch, wherein a control terminal of the sharing control switch is connected, on the one hand, via a first control switch to a scan line correlated with an $N^{th}$ pixel unit which is arranged in a scanning direction and counted from a present pixel unit, and on the other hand, via a second control switch to a scan line correlated with the present pixel unit. Under a two-dimensional scanning mode, the first control switch is configured to be turned on when at least there is a scan signal on a scan line to which the first control switch is connected, and the second control switch is configured to be turned off when at least there is a scan signal on both a scan line to which the second control switch is connected and on a scan line to which a first control switch in the same stage as the second one is connected. Under a three-dimensional scanning mode, the first control switch is configured to be turned off when at least there is a scan signal on the scan line to which the first control switch is connected, and the second control switch is configured to be turned on when at least there is a scan signal on the scan line to which the second control switch is connected.

To make the objective and technical solution of the present disclosure as well as the technical effect to be achieved more clearly, the present disclosure will be further described in detail in conjunction with the specific embodiments and drawings below.

Figure 1:
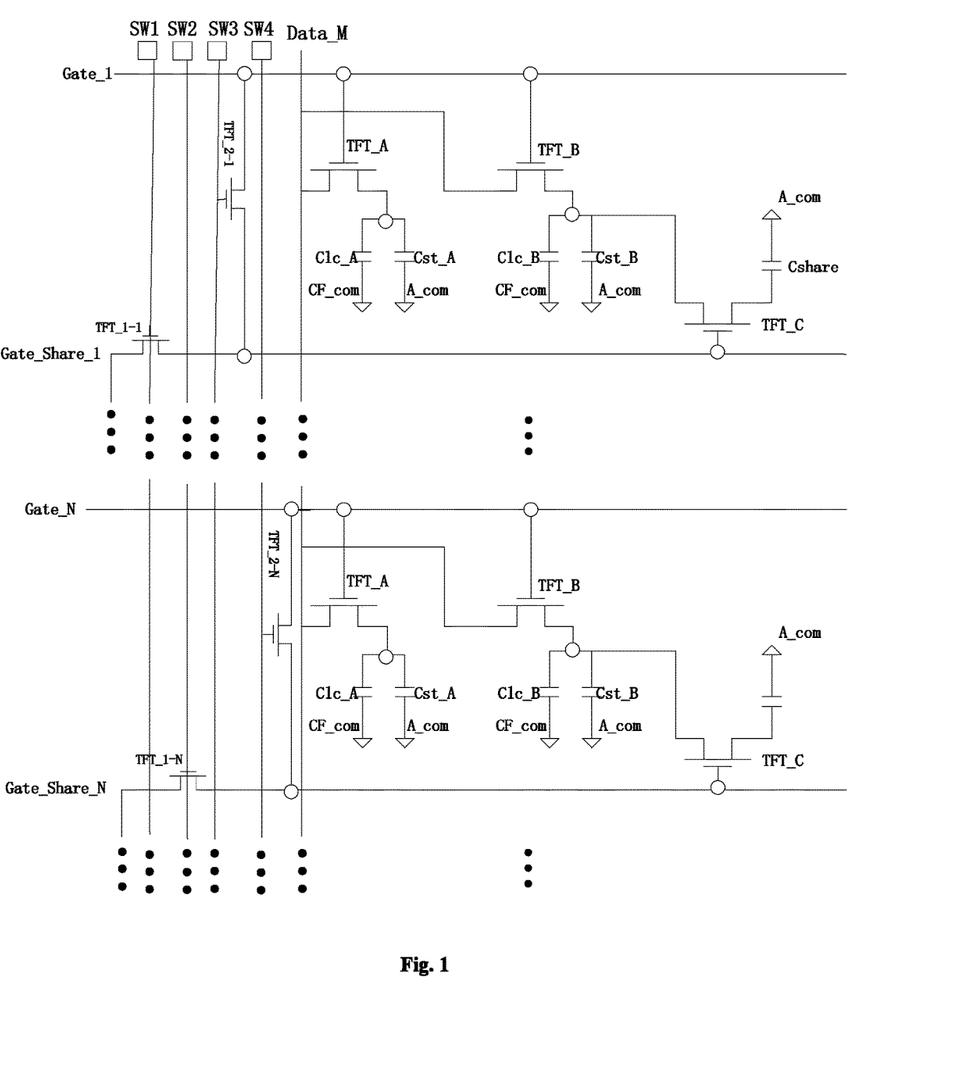
FIG. 1 is a partial equivalent circuit diagram of an array substrate according to the present disclosure.

FIG. 1 is a partial equivalent circuit diagram of the array substrate provided according to the present disclosure. The array substrate includes an image display area AA and a fan-out area (not shown). In this case, the image display area AA includes a plurality of common electrodes, a plurality of scan lines, a plurality of data lines, and a plurality of pixel units arranged in a pixel array formed by the plurality of scan lines and the plurality of data lines in a staggered manner. The pixel units each have the same structure, which corresponds to one scan line and one data line, and comprises a main-area electrode (Main), a sub-area electrode (Sub) and a charge sharing capacitor Cshare for sharing of charge. An example is taken below from a pixel unit PIM which is related to a first scan line Gate_1 and an $M^{th}$ data line Data_M, such that the structure of the pixel unit in the array substrate according to the present disclosure may be described in detail.

The main-area electrode (Main) is provided with a main-area control switch TFT_A. The main-area control switch TFT_A has a first terminal connected to the related data line Data_M, a second terminal connected to the main-area electrode, and a control terminal connected to the related scan line Gate_1. When the control terminal of the main-area control switch TFT_A receives a scan signal from a scan driving circuit via the scan line Gate_1, the first and second terminals of the main-area control switch TFT-A are turned on, so that a data signal of the data line Data_M generated from a data driving circuit is transmitted to the main-area electrode. At the same time, a main-area liquid crystal capacitor Clc_A formed through coupling of the main-area electrode with a common electrode CF_com of a color filter substrate, and a main-area storage capacitor Cst_A formed through coupling of the main-area electrode with a common electrode A_com of the array substrate start to be charged under the action of the data signal, so that the main-area electrode may have and maintain a certain level of main-area voltage.

The sub-area electrode (Sub) is provided with a sub-area control switch TFT_B, which has a first terminal connected to the related data line Data_M, a second terminal connected to the sub-area electrode, and a control terminal connected to the related scan line Gate_1. When the control terminal of the sub-area control switch TFT_B receives a scan signal from the scan driving circuit via the scan line Gate_1, the first and second terminals of the sub-area control switch TFT_B are both turned on, so that a data signal of the data line Data_M generated from the data driving circuit is transmitted to the sub-area electrode. Meanwhile, a sub-area liquid crystal capacitor Clc_B formed through coupling of the sub-area electrode with the common electrode CF_com of the color filter substrate, and a sub-area storage capacitor Cst_B formed through coupling of the sub-area electrode with the common electrode A_com of the array substrate start to be charged under the action of the data signal, so that the sub-area electrode may have and maintain a certain level of sub-area voltage.

The sharing capacitor Cshare is provided with a sharing control switch TFT_C. A first terminal of the sharing control switch TFT_C is connected to the sub-area electrode, and a second terminal thereof is connected to one end of the sharing capacitor Cshare, the other end of which is connected to the common electrode A_com of the array substrate. At the same time, a control terminal of the sharing control switch TFT_C is connected, on the one hand, via a first control switch TFT_1-1 to a scan line Gate_N which is correlated with an $N^{th}$ pixel unit arranged in a scanning direction and counted from the present pixel unit, and, on the other hand, via a second control switch TFT_2-1 to the scan line Gate_1 which is correlated with the present pixel unit.

It should be noted that, in the present embodiment, the numbers of the first control switches and the second control switches provided on the array substrate each are identical with the number of the scan lines, i.e., one first control switch together with one second control switch take charge of the pixel units related to one corresponding scan line, i.e., one corresponding row of pixel units. All of the first and second control switches in this embodiment are preferably arranged at the fan-out area of the array substrate and sequenced in terms of a scanning direction. In addition, for simple connection, auxiliary lines each matching one scan line are preferably arranged on the array substrate. The control terminal of the sharing control switch in each pixel unit is connected, by means of a corresponding auxiliary line, to the correlated first and second control switches.

As shown in FIG. 1, auxiliary lines Gate_Share_1, Gate_Share_2, Gate_Share_3 and the like each matching their own scan lines Gate_1, Gate_2, Gate_3 and the like are arranged on the array substrate. In a first row of pixel units, the control terminals of the sharing control switches, on the one hand, are connected through a first auxiliary line Gate_Share_1 to the related first control switch TFT_1-1 and, on the other hand, to the related second control switch TFT_2-1. And, the first control switch TFT_1-1 connects another terminal thereof to the $N^{th}$ scan line Gate_N through wiring, and the second control switch TFT_2-1 connects another terminal thereof to the first scan line Gate_1 through wiring. In a second row of pixel units, the control terminals of the sharing control switches, on the one hand, are connected through a second auxiliary line Gate_Share_2 to a related first control switch TFT_1-2 and, on the other hand, to a related second control switch TFT_2-2. The first control switch TFT_1-2 connects another terminal thereof to an $(N+1)^{th}$ scan line Gate_N+1 through wiring, and the second control switch TFT_2-2 connects another terminal thereof to the second scan line Gate_2 through wiring, and so on. In practice, of course, there are various wiring arrangements which are not limited thereto.

The above-mentioned main-area control switch, the sub-area control switch, the sharing control switch, the first control switch and the second control switch each may be thin film transistors.

In order to retain the charge sharing effect under the two-dimensional scanning mode to overcome the color shift due to a large viewing angle, and to break off the charge sharing effect under the three-dimensional scanning mode to eliminate the luminance difference between the left and right eyes, provided by the present disclosure is that: under the two-dimensional scanning mode, the first control switch is configured to be turned on when at least there is a scan signal on the scan line to which the first control switch is connected, and the second control switch is configured to be turned off when at least there is a scan signal on both the scan line to which the second control switch is connected and on the scan line to which a first control switch of the same stage as the second control switch is connected; and under the three-dimensional scanning mode, the first control switch is configured to be turned off when at least there is a scan signal on the scan line to which the first control switch is connected, and the second control switch is configured to be turned on when at least there is a scan signal on the scan line to which the second control switch is connected.

In this regard, one embodiment is provided by the present disclosure. That is, the first/second control switches are divided into two sets. A first set is composed of the first/second control switches which are related to the pixel units correlated with odd-numbered scan lines, and referred to as odd-set first/second control switches, while the first/second control switches which are related to the pixel units correlated with even-numbered scan lines are configured as the other set, and referred to as even-set first/second control switches. In this case: the odd-set first control switches TFT_1-1, TFT_1-3, TFT_1-5 and the like connect their control terminals to a first switch control line Line_1 in parallel so as to receive a first control signal SW1, and are turned on or off respectively under the action of this signal; the even-set first control switches TFT_1-2, TFT_1-4, TFT_1-6 and the like connect their control terminals to a second switch control line Line_2 in parallel so as to receive a second control signal SW2, and are turned on or off respectively under the action of this signal; the odd-set second control switches TFT_2-1, TFT_2-3, TFT_2-5 and the like connect their control terminals to a third switch control line Line_3 in parallel so as to receive a third control signal SW3, and are turned on or off respectively under the action of this signal; and the even-set second control switches TFT_2-2, TFT_2-4, TFT_2-6 and the like connect their control terminals to a fourth switch control line Line_4 in parallel so as to receive a fourth control signal SW4, and are turned on or off respectively under the action of this signal.

The first switch-control signal SW1 and the second switch-control signal SW2 described above are timing pulse signals that are synchronized with each other but of opposite polarities, while the third switch-control signal SW3 and the fourth switch-control signal SW4 are timing pulse signals that are synchronized with each other but of opposite polarities. Meanwhile, the second switch-control signal SW2 and the third switch-control signal SW3 have the same polarity. A pulse width of each of the timing pulse signals is equal to a time length T of the scan signal.

Further, the particular pulse sequence of each of the first switch-control signal SW1, the second switch-control signal SW2, the third switch-control signal SW3 and the fourth switch-control signal SW4 is also correlated with the parity of N.

Figure 2A:
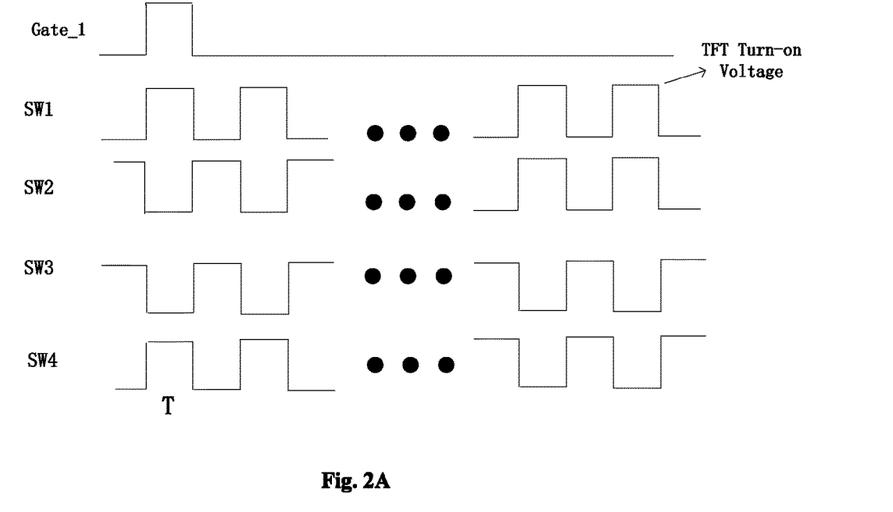
FIG. 2A is a diagram of a timing control signal under a two-dimensional scanning mode according to an embodiment of the present disclosure when N is an odd number.

FIG. 2A is a diagram of a timing control signal under a two-dimensional scanning mode when N is an odd number. In order to fulfill the operating condition "under a two-dimensional scanning mode, the first control switch is configured to be turned on when at least there is a scan signal on the scan line to which the first control switch is connected, and the second control switch is configured to be turned off when at least there is a scan signal on both the scan line to which the second control switch is connected and on the scan line to which a first control switch of the same stage as the second control switch is connected," the first switch-control signal SW1 is configured as a pulse train signal in terms of odd sequence and the second switch-control signal SW2 is in turn a pulse train signal in terms of even sequence, and then the third switch-control signal SW3 is configured as a pulse train signal in terms of even sequence and the fourth switch-control signal SW4 is in turn a pulse train signal in terms of odd sequence.

An example is taken below when N=3.

When a scan signal is input to the third scan line Gate_3, the first switch-control signal SW1 is at a high level and the third switch-control signal SW3 is of low-level, so that the first control switch TFT_1-1 to which the third scan line Gate_3 is connected is turned on and the second control switch TFT_2-3 to which the third scan line Gate_3 is connected is off, with the second control switch TFT_2-1 that is in the same stage as the first control switch TFT_1-1 being turned off. Therefore, in a pixel unit related to the third scan line Gate_3, the main-area and sub-area control switches are both turned on, so that the main-area and sub-area electrodes have an identical voltage under the action of a data signal of a corresponding data line. Meanwhile, the sharing control switch in a corresponding pixel unit to which the first scan line Gate_1 is related is turned on, such that a charge sharing effect is enabled and the voltage at the sub-area electrode is re-adjusted through the internal sharing capacitor, thereby eliminating the color shift.

When the fourth scan line Gate_4 is input with a scan signal, the second switch-control signal SW2 is at a high level and the fourth switch-control signal SW4 is of low level, so that the first control switch TFT_1-2 to which the fourth scan line Gate_4 is connected is turned on and the second control switch TFT_2-4 to which the fourth scan line Gate_4 is connected is turned off, with the second control switch TFT_2-2 that is in the same stage as the first control switch TFT_1-2 being turned off. Therefore, in a pixel unit related to the fourth scan line Gate_4, the main-area and sub-area control switches are both turned on, so that the main-area and sub-area electrodes have an identical voltage under the action of a data signal of a corresponding data line. Meanwhile, the sharing control switch in a corresponding pixel unit related to the second scan line Gate_2 is turned on, such that a charge sharing effect is enabled and the voltage of the sub-area electrode is re-adjusted by the internal sharing capacitor, whereby the color shift is eliminated In like manner, based on such a timing control manner in terms of two-dimensional scanning, whenever a scan signal is input to a scan line, a first control switch connected to the scan line is turned on and a second control switch connected to the scan line is turned off with, synchronously, a second control switch that is in the same stage as the first control switch being turned off. In this way, it is able to fulfill the aforementioned operating condition "the first control switch is configured to be turned on when at least there is a scan signal on the scan line to which the first control switch is connected, and the second control switch is configured to be turned off when at least there is a scan signal on both the scan line to which the second control switch is connected and on the scan line to which a first control switch of the same stage as the second control switch is connected."

Figure 2B:
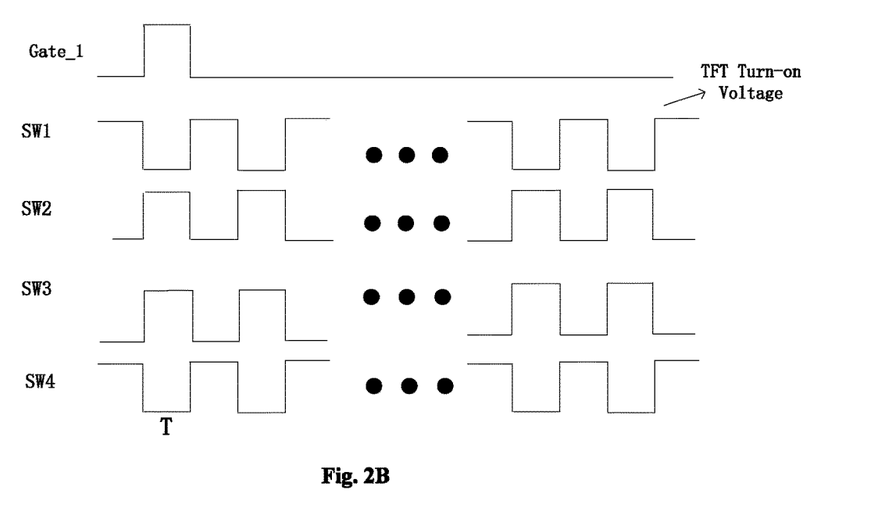
FIG. 2B is a diagram of a timing control signal under the two-dimensional scanning mode according to an embodiment of the present disclosure when N is an even number.

FIG. 2B is a diagram of a timing control signal under the two-dimensional scanning mode when N is an even number. In order to fulfill the operating condition "under a two-dimensional scanning mode, the first control switch is configured to be turned on when at least there is a scan signal on the scan line to which the first control switch is connected, and the second control switch is configured to be turned off when at least there is a scan signal on both the scan line to which the second control switch is connected and on the scan line to which a first control switch of the same stage as the second control switch is connected," the first switch-control signal SW1 is configured as a pulse train signal in terms of even sequence and the second switch-control signal SW2 is in turn a pulse train signal in terms of odd sequence, and then the third switch-control signal SW3 is configured as a pulse train signal in terms of odd sequence and the fourth switch-control signal SW4 is in turn a pulse train signal in terms of even sequence. As the whole operation process is similar to that of the two-dimensional scanning mode with N being odd, it will not be described here any further.

Figure 3A:
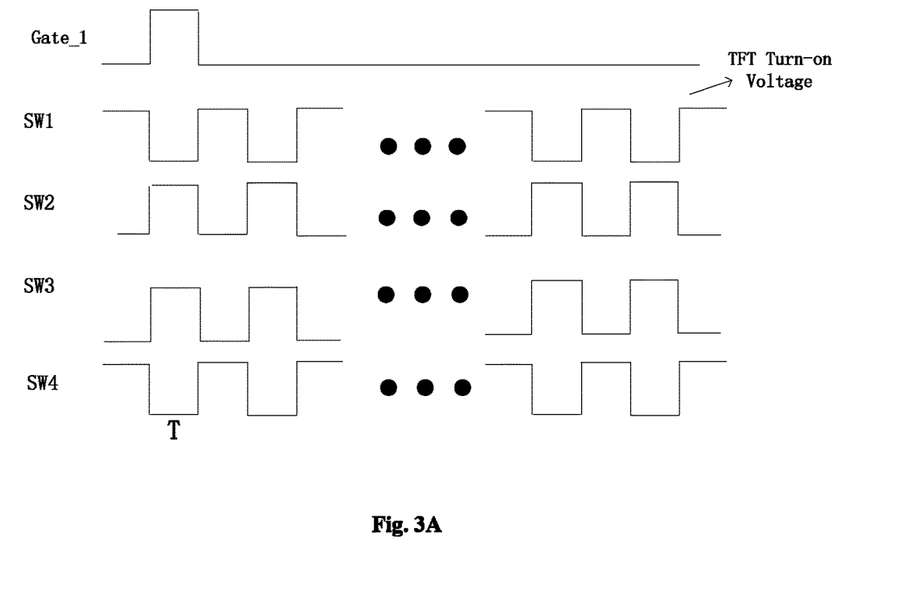
FIG. 3A is a diagram of a timing control signal under a three-dimensional scanning mode according to an embodiment of the present disclosure when N is an odd number.

FIG. 3A is a diagram of a timing control signal under a three-dimensional scanning mode when N is an odd number. In order to fulfill the operating condition "under a three-dimensional scanning mode, the first control switch is configured to be turned off when at least there is a scan signal on the scan line to which the first control switch is connected, and the second control switch is configured to be turned on when at least there is a scan signal on the scan line to which the second control switch is connected," the first switch-control signal SW1 is configured as a pulse train signal in terms of even sequence and the second switch-control signal SW2 is in turn a pulse train signal in terms of odd sequence, and then the third switch-control signal SW3 is configured as a pulse train signal in terms of odd sequence and the fourth switch-control signal SW4 is in turn a pulse train signal in terms of even sequence.

An example is taken below when N=3.

When the third scan line Gate_3 is input with a scan signal, the first switch-control signal SW1 is at a low level and the third switch-control signal SW3 is of high-level, so that the first control switch TFT_1-1 to which the third scan line Gate_3 is connected is turned off and the second control switch TFT_2-3 to which the third scan line Gate_3 is connected is on, with the second control switch TFT_2-1 that is in the same stage as the first control switch TFT_1-1 being turned on. Therefore, in a pixel unit related to the third scan line Gate_3, the main-area and sub-area control switches and the sharing control switch are all turned on, so that the main-area electrode, the sub-area electrode and the sharing capacitor have an identical voltage under the action of a data signal of a corresponding data line. Meanwhile, since the first control switch TFT_1-1 is turned off, the sharing control switch in a corresponding pixel unit of the first row connected to the first control switch TFT_1-1 via the auxiliary line Gate_Share_1 cannot be turned on, which means that the charge sharing effect is disabled. As such, the uneven luminance between the left and right eyes can be avoided.

When a scan signal is input to the fourth scan line Gate_4, the second switch-control signal SW2 is at a low level and the fourth switch-control signal SW4 is of high-level, so that the first control switch TFT_1-2 to which the fourth scan line Gate_4 is connected is turned off and the second control switch TFT_2-4 to which the fourth scan line Gate_4 is connected is turned on, and the second control switch TFT_2-2 that is in the same stage as the first control switch TFT_1-2 is turned on. Therefore, in a pixel unit related to the fourth scan line Gate_4, the main-area and sub-area control switches and the sharing control switch are all turned on, so that the main-area electrode, the sub-area electrode and the sharing capacitor have an identical voltage under the action of the data signal of a corresponding data line. Meanwhile, as the first control switch TFT_1-2 is turned off, the sharing control switch in a corresponding pixel unit of the first row connected to the first control switch TFT_1-1 via the auxiliary line Gate_Share_1 cannot be turned on, which means that the charge sharing effect is disabled. As a result of this, the uneven luminance between the left and right eyes can be avoided.

In like manner, based on such a timing control manner in terms of three-dimensional scanning, whenever a scan signal is input to a scan line, a first control switch connected to the scan line is turned off and a second control switch connected to the scan line is turned on with, synchronously, a second control switch that is in the same stage as the first control switch being turned on. In this way, it is able to fulfill the aforementioned operating condition "the first control switch is configured to be turned off when at least there is a scan signal on the scan line to which the first control switch is connected, and the second control switch is configured to be turned on when at least there is a scan signal on the scan line to which the second control switch is connected."

Figure 3B:
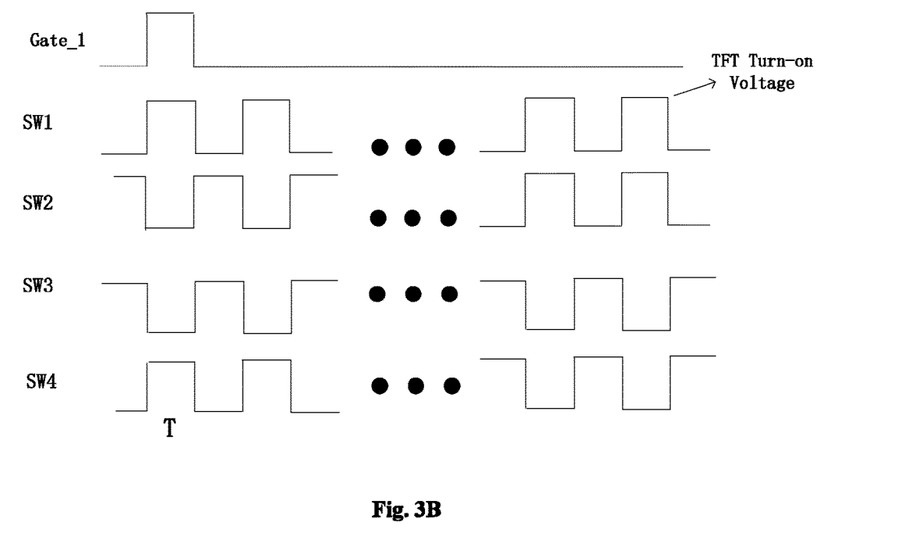
FIG. 3B is a diagram of a timing control signal under the three-dimensional scanning mode according to an embodiment of the present disclosure when N is an even number.

FIG. 3B is a diagram of a timing control signal under a three-dimensional scanning mode when N is an even number. To fulfill the operating condition "under a three-dimensional scanning mode, the first control switch is configured to be turned off when at least there is a scan signal on the scan line to which the first control switch is connected, and the second control switch is configured to be turned on when at least there is a scan signal on the scan line to which the second control switch is connected," the first switch-control signal SW1 is configured as a pulse train signal in terms of odd sequence and the second switch-control signal SW2 is in turn a pulse train signal in terms of even sequence, and then the third switch-control signal SW3 is configured as a pulse train signal in terms of even sequence and the fourth switch-control signal SW4 is in turn a pulse train signal in terms of odd sequence. Since the entire operation process thereof is similar to that of the three-dimensional scanning mode with N being odd, it will not be described herein any further.

Furthermore, the present disclosure further provides a liquid crystal display panel. The liquid crystal display panel comprises the aforementioned array substrate, a color filter substrate, and a liquid crystal layer positioned between the array substrate and the color filter substrate.

Although embodiments are presented as above, the foregoing content is merely used for explanation of the disclosure but not to limit the present disclosure. Any modifications and variations in the implementing manner and details can be made by a person skilled in the art within the spirit and scope of the present disclosure. Therefore, the scope of the present disclosure should be subjected to the scope defined by the appending claims.

The invention claimed is:
1. An array substrate, comprising:
a plurality of scan lines and a plurality of data lines; and
a plurality of pixel units arranged in an array formed by the plurality of scan lines and the plurality of data lines in a staggered manner, wherein each of the pixel units correlates with one of the scan lines and one of the data lines, and comprises:
a main-area electrode connected to a related data line via a main-area control switch, a control terminal of which switch is connected to a related scan line, such that the main-area electrode has, when there is a scan signal on the scan line, a main-area voltage by receiving a data signal from the data line;
a sub-area electrode connected to a related data line via a sub-area control switch, a control terminal of which switch is connected to a related scan line, such that the sub-area electrode has, when there is the scan signal on the scan line, a sub-area voltage by receiving the data signal from the data line; and
a sharing capacitor connected to the sub-area electrode via a sharing control switch, wherein a control terminal of the sharing control switch is connected, on the one hand, via a first control switch to a scan line correlated with an $N^{th}$ pixel unit which is arranged in a scanning direction and counted from a present pixel unit, and on the other hand, via a second control switch to a scan line correlated with the present pixel unit;
wherein under a two-dimensional scanning mode, the first control switch is configured to be turned on when at least there is a scan signal on a scan line to which the first control switch is connected, and the second control switch is configured to be turned off when at least there is a scan signal on both a scan line to which the second control switch is connected and on a scan line to which a first control switch of the same stage as the second control switch is connected; and under a three-dimensional scanning mode, the first control switch is configured to be turned off when at least there is a scan signal on the scan line to which the first control switch is connected, and the second control switch is configured to be turned on when at least there is a scan signal on the scan line to which the second control switch is connected.

2. An array substrate of claim 1, wherein,
control terminals of the first control switches correlated with pixel units to which odd-numbered scan lines are related are connected in parallel to a first switch-control line to receive a first switch-control signal, and control terminals of the first control switches correlated with pixel units to which even-numbered scan lines are related are connected in parallel to a second switch-control line to receive a second switch-control signal; and
control terminals of the second control switches correlated with pixel units to which the odd-numbered scan lines are related are connected in parallel to a third switch-control line to receive a third switch-control signal, and control terminals of the second control switches correlated with pixel units to which the even-numbered scan lines are related are connected in parallel to a fourth switch-control line to receive a fourth switch-control signal,
wherein the first switch-control signal and the second switch-control signal are timing pulse signals that are synchronized with each other but of opposite polarities, and the third switch-control signal and the fourth switch-control signal are timing pulse signals that are synchronized with each other but of opposite polarities, and at the same time, the second switch-control signal and the third switch-control signal have the same polarity,
wherein a pulse width of each of the timing pulse signals is equal to a time length T of the scan signal, and wherein:
under the two-dimensional scanning mode, if N is an odd/even number, then the first switch-control signal is a pulse train signal in terms of odd/even sequence; and
under the three-dimensional scanning mode, if N is an odd/even number, then the first switch-control signal is a pulse train signal in terms of even/odd sequence.

3. An array substrate of claim 1, wherein,
the array substrate is further provided with auxiliary lines each matching one of the scan lines, by means of the auxiliary lines the control terminals of the sharing control switches in the pixel units each being connected to their related first and second control switches.

4. An array substrate of claim 2, wherein,
the array substrate is further provided with auxiliary lines each matching one of the scan lines, by means of the auxiliary lines the control terminals of the sharing control switches in the pixel units each being connected to their related first and second control switches.

5. An array substrate of claim 3, wherein,
the first control switch and the second control switch are arranged at a fan-out area.

6. An array substrate of claim 4, wherein,
the first control switch and the second control switch are arranged at a fan-out area.

7. An array substrate of claim 1, wherein,
the main-area control switch, the sub-area control switch, the sharing control switch, the first control switch and the second control switch each are thin film transistors.

8. An array substrate of claim 2, wherein,
the main-area control switch, the sub-area control switch, the sharing control switch, the first control switch and the second control switch each are thin film transistors.

9. An array substrate of claim 5, wherein,
the main-area control switch, the sub-area control switch, the sharing control switch, the first control switch and the second control switch each are thin film transistors.

10. A liquid crystal display panel comprising an array substrate, the array substrate comprising:
a plurality of scan lines and a plurality of data lines; and
a plurality of pixel units arranged in an array formed by the plurality of scan lines and the plurality of data lines in a staggered manner, wherein each of the pixel units correlates with one of the scan lines and one of the data lines, and comprises:
a main-area electrode connected to a related data line via a main-area control switch, a control terminal of which switch is connected to a related scan line, such that the main-area electrode has, when there is a scan signal on the scan line, a main-area voltage by receiving a data signal from the data line;
a sub-area electrode connected to a related data line via a sub-area control switch, a control terminal of which switch is connected to a related scan line, such that the sub-area electrode has, when there is the scan signal on the scan line, a sub-area voltage by receiving the data signal from the data line; and
a sharing capacitor connected to the sub-area electrode via a sharing control switch, wherein a control terminal of the sharing control switch is connected, on the one hand, via a first control switch to a scan line correlated with an $N^{th}$ pixel unit which is arranged in a scanning direction and counted from a present pixel unit, and on the other hand, via a second control switch to a scan line correlated with the present pixel unit;
wherein under a two-dimensional scanning mode, the first control switch is configured to be turned on when at least there is a scan signal on a scan line to which the first control switch is connected, and the second control switch is configured to be turned off when at least there is a scan signal on both a scan line to which the second control switch is connected and on a scan line to which a first control switch of the same stage as the second control switch is connected; and under a three-dimensional scanning mode, the first control switch is configured to be turned off when at least there is a scan signal on the scan line to which the first control switch is connected, and the second control switch is configured to be turned on when at least there is a scan signal on the scan line to which the second control switch is connected.

11. A liquid crystal display panel of claim 10, wherein,
control terminals of the first control switches correlated with pixel units to which odd-numbered scan lines are related are connected in parallel to a first switch-control line to receive a first switch-control signal, and control terminals of the first control switches correlated with pixel units to which even-numbered scan lines are related are connected in parallel to a second switch-control line to receive a second switch-control signal; and
control terminals of the second control switches correlated with pixel units to which the odd-numbered scan lines are related are connected in parallel to a third switch-control line to receive a third switch-control signal, and control terminals of the second control switches correlated with pixel units to which the even-numbered scan lines are related are connected in parallel to a fourth switch-control line to receive a fourth switch-control signal, wherein the first switch-control signal and the second switch-control signal are timing pulse signals that are synchronized with each other but of opposite polarities, and the third switch-control signal and the fourth switch-control signal are timing pulse signals that are synchronized with each other but of opposite polarities, and at the same time, the second switch-control signal and the third switch-control signal have the same polarity, wherein a pulse width of each of the timing pulse signals is equal to a time length T of the scan signal, and wherein:

under the two-dimensional scanning mode, if N is an odd/even number, then the first switch-control signal is a pulse train signal in terms of odd/even sequence; and under the three-dimensional scanning mode, if N is an odd/even number, then the first switch-control signal is a pulse train signal in terms of even/odd sequence.

12. A liquid crystal display panel of claim 10, wherein, the array substrate is further provided with auxiliary lines each matching one of the scan lines, by means of the auxiliary lines the control terminals of the sharing control switches in the pixel units each being connected to their related first and second control switches.

13. A liquid crystal display panel of claim 11, wherein, the array substrate is further provided with auxiliary lines each matching one of the scan lines, by means of the auxiliary lines the control terminals of the sharing control switches in the pixel units each being connected to their related first and second control switches.

14. A liquid crystal display panel of claim 10, wherein, the first control switch and the second control switch are arranged at a fan-out area.

15. A liquid crystal display panel of claim 11, wherein, the first control switch and the second control switch are arranged at a fan-out area.

16. A liquid crystal display panel of claim 12, wherein, the first control switch and the second control switch are arranged at a fan-out area.

17. A method for driving a liquid crystal display panel, including steps for driving two-dimensional scanning and steps for driving three-dimensional scanning, wherein the steps for driving the two-dimensional scanning comprise:

sequentially inputting, in a scanning direction, a scan signal to each scan line; and turning off, when a scan signal is input to a scan line, a second control switch connected to the scan line, so as to turn on a main-area control switch and a sub-area control switch in a pixel unit correlated with the scan line, so that a main-area electrode and a sub-area electrode have an identical voltage under the action of a data signal of a corresponding data line; and at the same time, turning on a first control switch connected to the scan line, and turning off a second control switch of the same stage as the first control switch, so that a charge sharing effect is enabled, through an internal sharing capacitor, at a pixel unit related to the first control switch connected to the scan line; and wherein the steps for driving the three-dimensional scanning comprises:

sequentially inputting, in a scanning direction, a scan signal to each scan line; and turning on, when a scan signal is input to a scan line, a second control switch connected to the scan line, so as to turn on a main-area control switch, a sub-area control switch, and a sharing control switch in a pixel unit correlated with the scan line, so that a main-area electrode, a sub-area electrode, and a sharing capacitor have an identical voltage under the action of a data signal of a corresponding data line; and at the same time, turning off a first control switch connected to the scan line.

18. A method of claim 17, comprising: applying a first switch-control signal to control terminals of the first control switches correlated with the pixel units to which odd-numbered scan lines are related, applying a second switch-control signal to control terminals of the first control switches correlated with the pixel units to which even-numbered scan lines are related, applying a third switch-control signal to control terminals of the second control switches correlated with the pixel units to which the odd-numbered scan lines are related, and applying a fourth switch-control signal to control terminals of the second control switches correlated with the pixel units to which the even-numbered scan lines are related, wherein the first switch-control signal and the second switch-control signal are timing pulse signals that are synchronized with each other but of opposite polarities, and the third switch-control signal and the fourth switch-control signal are timing pulse signals that are synchronized with each other but of opposite polarities, and at the same time, the second switch-control signal and the third switch-control signal have the same polarity, wherein a pulse width of each of the timing pulse signals is equal to a time length T of the scan signal, and wherein:

under a two-dimensional scanning mode, if N is an odd/even number, then the first switch-control signal is a pulse train signal in terms of odd/even sequence; and under a three-dimensional scanning mode, if N is an odd/even number, then the first switch-control signal is a pulse train in terms of even/odd sequence.

* * * * *